(12) United States Patent
Nakajima et al.

(10) Patent No.: US 11,111,946 B2
(45) Date of Patent: Sep. 7, 2021

(54) RUST PROOFING TREATMENT LIQUID FOR THREADED PART, METHOD FOR PRODUCING RUST-PROOFED THREADED PART, AND RUST-PROOFED THREADED PART

(71) Applicant: AOYAMA SEISAKUSHO CO., LTD., Niwa-Gun (JP)

(72) Inventors: Shingo Nakajima, Niwa-Gun (JP); Takashi Ito, Niwa-Gun (JP)

(73) Assignee: Aoyama Seisakusho Co., Ltd., Niwa-Gun (JP)

( * ) Notice: Subject to any disclaimer, the term of this patent is extended or adjusted under 35 U.S.C. 154(b) by 0 days.

(21) Appl. No.: 16/225,520

(22) Filed: Dec. 19, 2018

(65) Prior Publication Data

US 2019/0128310 A1     May 2, 2019

Related U.S. Application Data

(63) Continuation of application No. PCT/CN2017/014342, filed on Apr. 6, 2017.

(30) Foreign Application Priority Data

Aug. 4, 2016    (JP) .............................. JP2016-153839

(51) Int. Cl.
     *F16B 33/00*        (2006.01)
     *C09D 5/08*         (2006.01)
     *F16B 35/00*        (2006.01)
     *C09D 163/10*      (2006.01)
     (Continued)

(52) U.S. Cl.
CPC .............. *F16B 33/008* (2013.01); *B05D 7/16* (2013.01); *B05D 7/51* (2013.01); *C09D 5/08* (2013.01);
(Continued)

(58) Field of Classification Search
CPC ...................................................... F16B 33/008
See application file for complete search history.

(56) References Cited

U.S. PATENT DOCUMENTS

2006/0228575 A1* 10/2006 Klos ..................... F16B 33/008
                                                                  428/621
2007/0134503 A1*  6/2007 Espinosa .............. C09D 183/14
                                                                  428/450
(Continued)

FOREIGN PATENT DOCUMENTS

EP          2 860 432 A1     4/2015
JP         2004-307755 A1    11/2004
(Continued)

OTHER PUBLICATIONS

Extended European Search Report (Application No. 17836555.7) dated May 3, 2019.

(Continued)

*Primary Examiner* — Megan McCulley
(74) *Attorney, Agent, or Firm* — Burr & Brown, PLLC

(57) ABSTRACT

Threaded parts such as bolts are rust-proofed by using a treatment liquid including a binder resin containing silica and at least one of a modified epoxy resin obtained by graft polymerization using a carboxylic acid-containing acrylic polymer as a side chain and a modified acrylic resin obtained by graft polymerization using a carboxylic acid-containing acrylic polymer as a side chain. By using this treatment liquid, coating treatment can be carried out at one time without need to use an organic solvent. There is an advantage that the friction coefficient does not increase even when tightening is repeated.

2 Claims, 5 Drawing Sheets

(51) Int. Cl.
  B05D 7/00 (2006.01)
  B05D 7/16 (2006.01)
  C09D 163/00 (2006.01)
  C09D 167/04 (2006.01)
  C23C 22/62 (2006.01)
  B32B 27/08 (2006.01)
  B32B 27/20 (2006.01)
  B32B 27/30 (2006.01)
  B32B 27/38 (2006.01)

(52) U.S. Cl.
  CPC ......... C09D 163/00 (2013.01); C09D 163/10 (2013.01); C09D 167/04 (2013.01); F16B 35/00 (2013.01); B32B 27/08 (2013.01); B32B 27/20 (2013.01); B32B 27/308 (2013.01); B32B 27/38 (2013.01); B32B 2250/03 (2013.01); B32B 2255/06 (2013.01); B32B 2255/10 (2013.01); B32B 2255/28 (2013.01); B32B 2305/30 (2013.01); B32B 2307/752 (2013.01); B32B 2311/20 (2013.01); B32B 2311/30 (2013.01); B32B 2363/00 (2013.01); B32B 2391/00 (2013.01); C23C 22/62 (2013.01)

(56) References Cited

U.S. PATENT DOCUMENTS

| | | | | |
|---|---|---|---|---|
| 2011/0070429 | A1* | 3/2011 | Rochester | C23C 22/48 428/336 |
| 2012/0112456 | A1* | 5/2012 | Nagareo | F16L 15/001 285/390 |
| 2013/0075083 | A1* | 3/2013 | Gard | F16L 58/182 166/242.6 |
| 2015/0192229 | A1* | 7/2015 | Goto | C10M 171/00 285/94 |
| 2015/0210862 | A1 | 7/2015 | Matsuda et al. | |
| 2015/0210888 | A1 | 7/2015 | Goto | |
| 2015/0274984 | A1 | 10/2015 | Zhang et al. | |
| 2015/0275125 | A1 | 10/2015 | Karaki et al. | |
| 2016/0289466 | A1* | 10/2016 | Wapner | C09D 5/4496 |
| 2017/0096564 | A1* | 4/2017 | Seeger | B05D 5/00 |
| 2017/0101716 | A1* | 4/2017 | Roth | C23C 2/06 |

FOREIGN PATENT DOCUMENTS

| | | |
|---|---|---|
| JP | 2008-001788 A1 | 1/2008 |
| JP | 2015-048495 A1 | 3/2015 |
| JP | 2015-151511 A1 | 8/2015 |
| JP | 2015-190060 A1 | 11/2015 |
| WO | 2010/140703 A1 | 12/2010 |
| WO | 2014/042144 A1 | 3/2014 |

OTHER PUBLICATIONS

Novel Water-Based Modified Epoxy Resin MODEPICS 300 Series, *Arakawa News*, Jan. 2007, No. 336, pp. 2-7 (with English translation).

International Search Report and Written Opinion (Application No. PCT/JP2017/014342) dated May 16, 2017.

* cited by examiner

"Prior Art"

"Prior Art"

"Prior Art"

RUST PROOFING TREATMENT LIQUID FOR THREADED PART, METHOD FOR PRODUCING RUST-PROOFED THREADED PART, AND RUST-PROOFED THREADED PART

CROSS REFERENCE TO RELATED APPLICATIONS

This application is a continuation of International Application No. PCT/JP2017/014342 filed Apr. 6, 2017, which designated the United States, and claims the benefit under 35 USC § 119(a)-(d) of Japanese Application No. 2016-153839 filed Aug. 4, 2016, the entireties of which are incorporated herein by reference.

FIELD OF THE INVENTION

The present invention relates to a technique for producing threaded parts such as bolts and nuts having excellent rustproof properties, and, more particularly, to a rust proofing treatment liquid for a threaded part, a method for producing a rust-proofed threaded part, and a rust-proofed threaded part.

BACKGROUND OF THE INVENTION

For example, underbody parts such as automobile suspensions may frequently come into contact with water during traveling, and, therefore, for threaded parts such as bolts and nuts used in such parts, excellent rustproof performance is required.

As shown in FIG. 1, threaded parts of this kind usually have rustproof performance by forming a zinc plating layer 2 on a surface of an iron substrate 1. However, when tightening is repeated, the friction coefficient of the zinc plating layer 2 gradually increases, so that stable tightening cannot be made without any change.

Therefore, as shown in FIG. 2, a friction coefficient stabilizing layer 3 mainly composed of a wax is formed on a surface of the zinc plating layer 2 so that the friction coefficient does not increase even when tightening is repeated. However, a coating layer composed of the zinc plating layer 2 and the friction coefficient stabilizing layer 3 is easily scratched, and rust may be generated by contact with water. Then, there is a possibility that hydrogen may enter the inside of the iron substrate 1 from the rust portion, resulting in progress of delayed fracture due to hydrogen embrittlement, leading to bolt breaking.

In order to solve this problem, as shown in FIG. 3, a rust inhibitor layer 4 is formed on a surface of the zinc plating layer 2, and the friction coefficient stabilizing layer 3 is further formed on a surface thereof. However, since two coating treatments, i.e., formation of the rust inhibitor layer 4 and formation of the friction coefficient stabilizing layer 3, are required, there is a problem of much cost required. Besides, both the rust inhibitor layer 4 and the friction coefficient stabilizing layer 3 use an acrylic resin as a film forming component, and coating treatments are carried out using a solvent having a low flash point, so that explosion-proof facilities are required and, besides, other problems such as necessity for high-temperature drying arise.

Patent Literature 1 describes a rust proofing treatment liquid for a threaded part which is suitable for bolts and nuts. The rust proofing treatment liquid for a threaded part contains a rust inhibitor in addition to zinc powder. However, since it uses an organic solvent, there is the problem of necessity for explosion-proof facilities as described above. In addition, the invention of Patent Literature 1 aims at suppressing an increase over time in viscosity of the rust proofing treatment liquid for a threaded part, not aiming at stabilization of the friction coefficient when tightening is repeated.

CITATION LIST

Patent Literature

Patent Literature 1: JP 2015-48495 A

SUMMARY OF THE INVENTION

It is therefore an object of the present invention to provide a rustproof treatment technique for a threaded part capable of solving the above-described conventional problems and forming a rustproof coating film capable of suppressing an increase in friction coefficient even when tightening is repeated, by a single coating treatment without using an organic solvent.

In order to solve the above problems, the present inventors have studied the problems of the prior art, and, as a result, have concluded that in order to obtain a characteristic (hereinafter referred to as repetitive stability) of successfully suppressing an increase in friction coefficient even when tightening is repeated, it is preferable to use a resin having higher strength than that of conventional acrylic resins as a resin which is a film forming component of a rust inhibitor layer and that, in order to carry out coating treatment at one time without using an organic solvent, it is preferable to disperse a rust inhibitor and a lubricant in a water-soluble resin.

The present invention has been accomplished based on the above findings, and the rust proofing treatment liquid for a threaded part according to the present invention includes a binder resin containing silica and at least one of a modified epoxy resin obtained by graft polymerization using a carboxylic acid-containing acrylic polymer as a side chain and a modified acrylic resin obtained by graft polymerization using a carboxylic acid-containing acrylic polymer as a side chain.

According to the present invention having the above feature, it is possible to carry out coating treatment at one time without using an organic solvent, thereby forming a rustproof coating film capable of suppressing an increase in friction coefficient even when tightening is repeated.

DETAILED DESCRIPTION OF THE INVENTION

Figure 1:
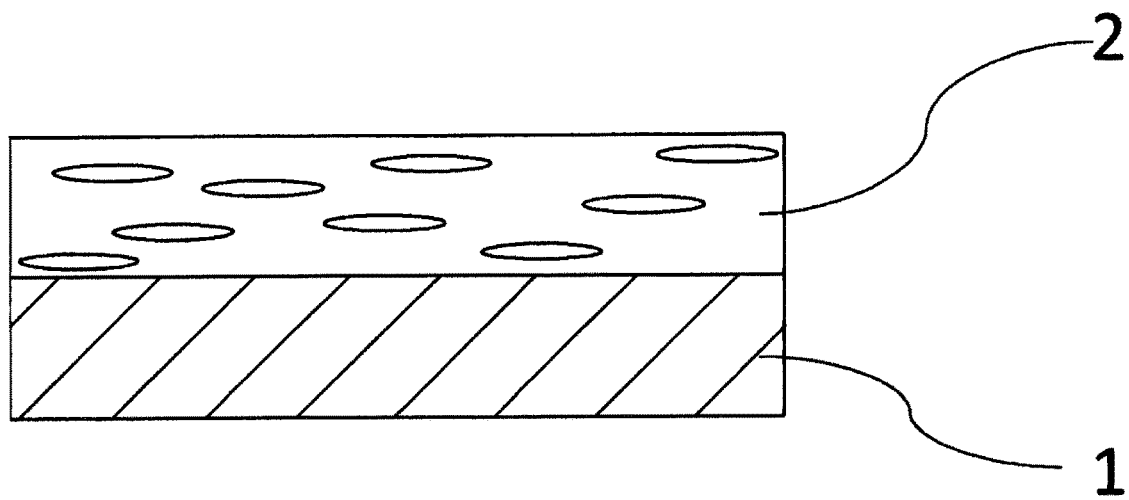
FIG. 1 is an image diagram of a coating film of a threaded part rust-proofed according to a conventional technique.
Figure 2:
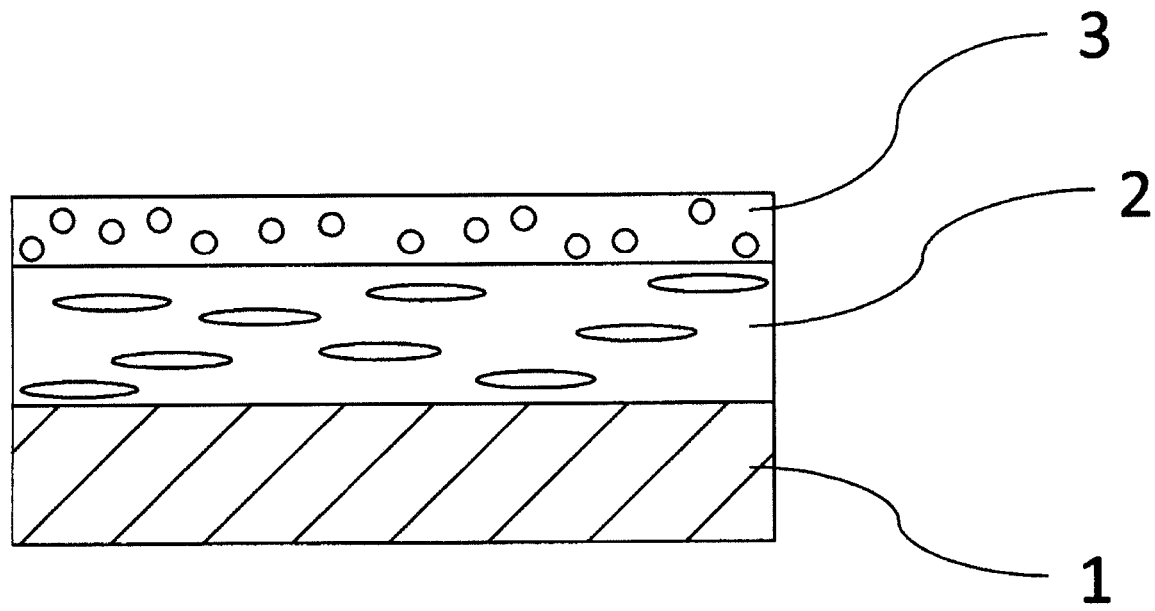
FIG. 2 is an image diagram of the coating film of the threaded part rust-proofed according to the conventional technique.
Figure 3:
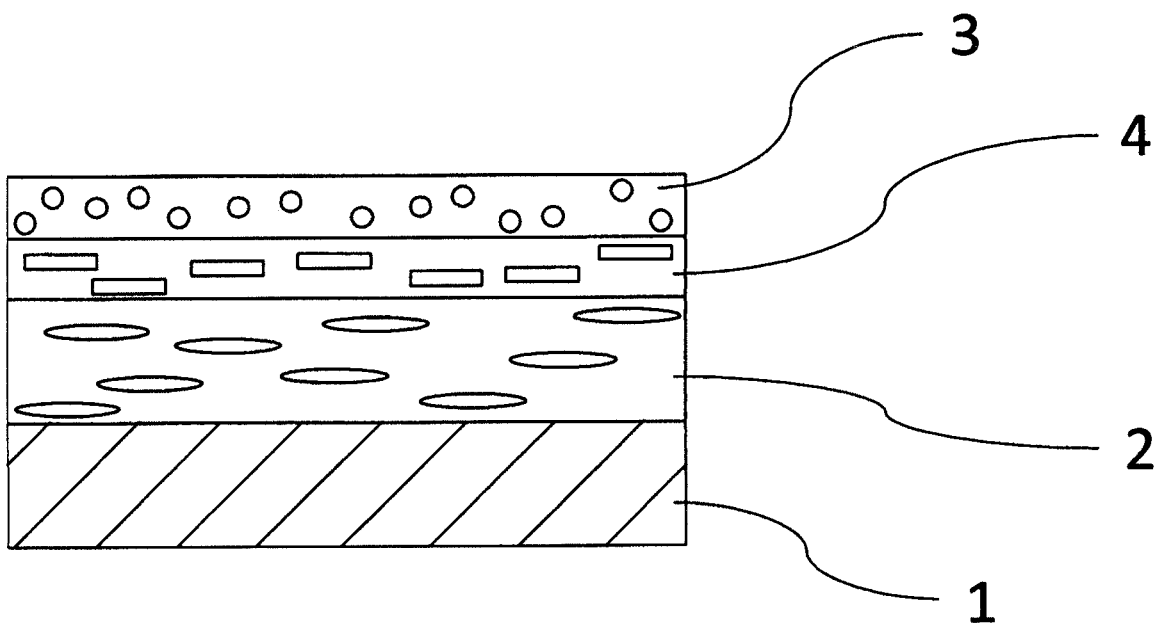
FIG. 3 is an image diagram of the coating film of the threaded part rust-proofed according to the conventional technique.

Hereinafter, an embodiment of the present invention will be described in detail.

Rust Proofing Treatment Liquid for Threaded Part

A rust proofing treatment liquid for a threaded part of the present embodiment includes an aqueous binder resin and a pigment, and, as needed, a wax which is a friction coefficient controlling agent. In the preparation of a paint composition, the binder resin may be used in the form of an emulsion or in the form of a solution. The aqueous binder resin includes a resin obtained by graft polymerization using a carboxylic acid-containing acrylic polymer as a side chain. The resin obtained by graft polymerization using a carboxylic acid-containing acrylic polymer as a side chain is preferably at least one of a modified epoxy resin obtained by graft polymerization using a carboxylic acid-containing acrylic polymer as a side chain and a modified acrylic resin obtained by graft polymerization using a carboxylic acid-containing acrylic polymer as a side chain.

Modified Epoxy Resin

The modified epoxy resin is obtained by polymerizing unsaturated monomers including as essential components an acrylate-based monomer (A2) and a carboxyl group-containing radically polymerizable unsaturated monomer (A3) in the presence of a modified epoxy resin (A1) obtained by reacting an epoxy resin (a1), a glycidyl group-containing radically polymerizable unsaturated monomer (a2) and an amine (a3).

Examples of the epoxy resin (a1) in the production of the modified epoxy resin (A1) include a resin obtained by condensing epichlorohydrin and bisphenol to have a high molecular weight in the presence of a catalyst such as an alkali catalyst as needed, and a resin obtained by condensing epichlorohydrin and bisphenol in the presence of a catalyst such as an alkali catalyst as needed to prepare a low molecular weight epoxy resin and subjecting the resulting low molecular weight epoxy resin and bisphenols to a polyaddition reaction.

Examples of the bisphenols include bis(4-hydroxyphenyl) methane [bisphenol F], 1,1-bis(4-hydroxyphenyl)ethane, 2,2-bis(4-hydroxyphenyl)propane [bisphenol A], 2,2-bis(4-hydroxyphenyl)butane [bisphenol B], bis(4-hydroxyphenyl)-1,1-isobutane, bis(4-hydroxy-tert-butyl-phenyl)-2,2-propane, p-(4-hydroxyphenyl)phenol, oxybis(4-hydroxyphenyl), sulfonylbis(4-hydroxyphenyl), 4,4'-dihydroxybenzophenone, and bis(2-hydroxynaphthyl) methane. Among these, bisphenol A and bisphenol F are preferably used. The bisphenols can be used singly or as a mixture of two or more.

Examples of commercially available products of the epoxy resin (a1) include jER 1007 (epoxy equivalent: about 1,700, number average molecular weight: about 2,900), jER 1009 (epoxy equivalent: about 3,500, number average molecular weight: about 3,750), and jER 1010 (epoxy equivalent: about 4,500, number average molecular weight: about 5,500) all manufactured by Mitsubishi Chemical Corporation; Araldite AER 6099 (epoxy equivalent: about 3,500, number average molecular weight: about 3,800) manufactured by Asahi Kasei E-Materials Co., Ltd.; and Epomic R-309 manufactured by Mitsui Chemicals, Inc. (epoxy equivalent: about 3,500, number average molecular weight: about 3,800).

The number average molecular weight and weight average molecular weight defined herein are number average molecular weight and weight average molecular weight in terms of polystyrene as measured by gel permeation chromatography.

The epoxy resin (a1) is preferably a bisphenol type epoxy resin, and its number average molecular weight is preferably 2,000 to 35,000, more preferably 4,000 to 30,000, and its epoxy equivalent is preferably 1,000 to 12,000, more preferably 3,000 to 10,000.

Examples of the glycidyl group-containing radically polymerizable unsaturated monomer (a2) include glycidyl (meth) acrylate, β-methylglycidyl (meth) acrylate, and (meth) allyl glycidyl ether.

Examples of the amine (a3) include mono- or di-alkylamines such as monomethylamine, dimethylamine, monoethylamine, diethylamine, monoisopropylamine, diisopropylamine, monobutylamine, and dibutylamine; alkanolamines such as monoethanolamine, diethanolamine, mono (2-hydroxypropyl) amine, di (2-hydroxypropyl) amine, monomethylaminoethanol, and monoethylaminoethanol; alkylenepolyamines such as ethylenediamine, propylenediamine, butylenediamine, hexamethylenediamine, tetraethylenepentamine, pentaethylenehexamine, diethylaminopropylamine, diethylenetriamine, and triethylenetetramine; alkyleneimines such as ethyleneimine and propylenimine; and cyclic amines such as piperazine, morpholine, and pyrazine.

In the production of the modified epoxy resin (A1), monovalent to trivalent organic acids, monovalent to tetravalent alcohols, isocyanate compounds, and the like can be used for the purpose of improving water dispersibility and corrosion resistance, as needed.

As the above-mentioned monovalent to trivalent organic acids, various known aliphatic, alicyclic, or aromatic carboxylic acids can be used, and examples thereof include dimer acid and trimellitic acid. As the monovalent to tetravalent alcohols, various known aliphatic, alicyclic, or aromatic alcohols can be used, and examples thereof include neopentyl glycol, trimethylolpropane, and pentaerythritol. As the isocyanate compounds, various known aromatic, aliphatic, or alicyclic polyisocyanates can be used, and examples thereof include tolylene diisocyanate, hexamethylene diisocyanate, isophorone diisocyanate, xylylene diisocyanate, and 4,4'-diphenylmethane diisocyanate. These monovalent to trivalent organic acids, monovalent to tetravalent alcohols, isocyanate compounds, and the like can be used as needed within the scope in which the effects of the present invention would not be impaired.

The modified epoxy resin (A1) can be easily produced by heating the above-mentioned components in the presence of an organic solvent. The reaction temperature and reaction time can be usually from 60 to 200° C., preferably from 90 to 150° C., for 1 to 10 hours, preferably 1 to 5 hours, respectively.

Examples of the organic solvent include alcohol-based solvents such as methyl alcohol, ethyl alcohol, n-butyl alcohol, isopropyl alcohol, 2-ethylhexanol, benzyl alcohol, ethylene glycol, and propylene glycol; ether-based solvents such as ethyleneglycol monoethyl ether, ethyleneglycol monobutyl ether, ethyleneglycol monohexyl ether, ethyleneglycol mono-2-ethylhexyl ether, diethyleneglycol monobutyl ether, propyleneglycol monomethyl ether, propyleneglycol monophenyl ether, 3-methyl-3-methoxybutanol, diethyleneglycol monoethyl ether, and diethyleneglycol monobutyl ether; ketone-based solvents such as acetone, methyl isobutyl ketone, cyclohexanone, isophorone, and acetylacetone; ester-based solvents such as ethyleneglycol monoethyl ether acetate and ethyleneglycol monobutyl ether acetate; and mixtures thereof.

The modified epoxy resin can be produced by polymerizing an acrylate monomer (A2) and a carboxyl group-containing radically polymerizable unsaturated monomer (A3), and, as needed, any other polymerizable unsaturated monomer (A4) in the presence of the modified epoxy resin (A1) obtained in the above manner.

The acrylate monomer (A2) is a monomer having at least one acryloyloxy group ($CH_2$=CHCOO—) or methacryloyloxy group ($CH_2$=C($CH_3$)COO—), and specific examples thereof include monomers of $C_1$-$C_{18}$ alkyl or cycloalkyl esters of acrylic acid or methacrylic acid such as methyl acrylate, ethyl acrylate, n-propyl acrylate, isopropyl acrylate, n-, i- or t-butyl acrylate, hexyl acrylate, 2-ethylhexyl acrylate, n-octyl acrylate, decyl acrylate, lauryl acrylate, cyclohexyl acrylate, methyl methacrylate, ethyl methacrylate, n-propyl methacrylate, isopropyl methacrylate, n-, i- or t-butyl methacrylate, hexyl methacrylate, 2-ethylhexyl methacrylate, octyl methacrylate, decyl methacrylate, lauryl methacrylate, and cyclohexyl methacrylate; and $C_2$-$C_8$ hydroxyalkyl esters of acrylic acid or methacrylic acid such as 2-hydroxyethyl acrylate, 2-hydroxypropyl acrylate, 3-hydroxypropyl acrylate, hydroxybutyl acrylate, 2-hydroxyethyl methacrylate, 2-hydroxypropyl methacrylate, 3-hydroxypropyl methacrylate, and hydroxybutyl methacrylate. These monomers can be used alone or in combination of two or more.

The carboxyl group-containing radically polymerizable unsaturated monomer (A3) is used for making the resulting modified epoxy resin aqueous (water dispersion or dissolution), and specific examples thereof include (meth) acrylic acid, maleic acid, crotonic acid, itaconic acid, and fumaric acid monomers. These monomers may be used alone or in combination of two or more.

The other polymerizable unsaturated monomer (A4) may be any monomer copolymerizable with the carboxyl group-containing polymerizable unsaturated monomer, and can be appropriately selected and used according to required performance. Examples of the monomer (A4) include one, or a mixture of two or more, of aromatic vinyl monomers such as styrene, vinyltoluene, 2-methylstyrene, t-butylstyrene, and chlorostyrene; and N-substituted acrylamide or N-substituted methacrylamide monomers such as N-methylolacrylamide, N-butoxymethylacrylamide, N-methoxymethyl acrylamide, N-methylol methacrylamide, and N-butoxymethyl methacrylamide.

Here, various known organic peroxides and azo compounds such as benzoyl peroxide, tert-butyl peroctoate, 2,2-azobisisobutyronitrile, and 2,2-azobis (2,4-dimethylvaleronitrile) can be used for a copolymerization reaction of the modified epoxy resin (A1) with the acrylate-based monomer (A2) and the carboxyl group-containing radically polymerizable unsaturated monomer (A3), and any other polymerizable unsaturated monomer (A4) to be blended as needed.

In the copolymerization reaction, the polymerization manner is not limited, but is preferably a solution polymerization method. For example, polymerization can be carried out at a reaction temperature of 60 to 150° C. in the presence of the above-mentioned polymerization initiator. As for the organic solvent, the same one as used in the production of the modified epoxy resin (A1) can be used.

The modified epoxy resin has an acid value of preferably 5 to 100 mg KOH/g, more preferably 10 to 80 mg KOH/g. The hydroxyl value of the modified epoxy resin is preferably from 10 to 350 mg KOH/g, more preferably from 30 to 330 mg KOH/g. Further, the weight average molecular weight of the modified epoxy resin is preferably from 10,000 to 200,000, more preferably from 30,000 to 200,000, still more preferably from 70,000 to 180,000.

The modified epoxy resin preferably has a glass transition temperature (Tg) of 50 to 100° C. from the viewpoint of further improving the initial drying property and the coating film hardness. The glass transition temperature can be measured using, for example, a differential scanning calorimeter.

Examples of commercial products of the modified epoxy resin include Modepics 301, Modepics 302, Modepics 303, and KA-1828 (all manufactured by Arakawa Chemical Industries, Ltd.).

When a binder resin containing a modified epoxy resin and silica is used, the proportion of the modified epoxy resin in the binder resin is 20 to 40% by mass, preferably 25 to 35% by mass, more preferably 28 to 32 mass %. Within this range, it is possible to stabilize the friction coefficient and to reduce variations.

When a binder resin containing a modified epoxy resin and silica is used, the rust proofing treatment liquid for a threaded part is prepared by mixing an aqueous binder resin, a pigment, and a wax which is a friction coefficient controlling agent, and stirring the mixture.

Modified Acrylic Resin

The above-mentioned modified acrylic resin is obtained by polymerizing unsaturated monomers including as essential components an acrylate-based monomer (B2) and a carboxyl group-containing radically polymerizable unsaturated monomer (B3) in the presence of a modified acrylic resin (B1) obtained by reacting an acrylic rein (b1), a glycidyl group-containing radically polymerizable unsaturated monomer (b2), and an amine (b3).

When a binder resin containing a modified acrylic resin and silica is used, the proportion of the modified acrylic resin in the binder resin is 20 to 40% by mass, preferably 25 to 35% by mass, more preferably 26 to 30% by mass %. Within this range, it is possible to stabilize the friction coefficient and to reduce variations.

When a binder resin containing a modified acrylic resin and silica is used, the rust proofing treatment liquid for a threaded part is prepared by mixing an aqueous binder resin and a pigment while stirring.

Method for Producing Rust-Proofed Threaded Part

The rust proofing treatment liquid for a threaded part is prepared by mixing the above-mentioned components while stirring. The order of mixing the components is not limited, and it is possible to mix them in any order. The prepared rust proofing treatment liquid for a threaded part is applied to a surface of the threaded part. Various techniques can be adopted according to the size and shape of the screw, such as dipping, roll coating, spraying, brush coating, and spin coating, for applying the rust proofing treatment liquid to the surface of the threaded part.

Prior to the application of the rust proofing treatment liquid for a threaded part, a corrosion-resistant metal film is formed on the surface of the threaded part. The corrosion-resistant film may be, for example, a zinc plating layer made of zinc, a zinc alloy, or the like, or may be a chemically-converted layer obtained by subjecting the zinc plating layer to chemical conversion treatment. Further, it may be a finished layer obtained by subjecting the chemically-converted layer to finish treatment, for example, for the purpose of improving the corrosion resistance and appearance and stabilizing the friction coefficient.

The application of the rust proofing treatment liquid for a threaded part is carried out so that the thickness of the coating film formed after heating treatment is 1 to 5 μm, preferably 2 to 4 μm, more preferably 2.5 to 3.5 μm. The liquid temperature of the rust proofing treatment liquid for a threaded part when applied is not particularly limited, and usually a room-temperature rust proofing treatment liquid for a threaded part is applied.

Once the rust proofing treatment liquid for a threaded part is applied to the surface of the threaded part, the rust proofing treatment liquid for a threaded part penetrates into the surface layer of the corrosion-resistant film. A metal such as zinc in the corrosion-resistant film is dissolved by the strongly alkaline rust proofing treatment liquid for a threaded part, so that metal ions such as $Zn^{2+}$ are eluted. The metal ions such as $Zn^{2+}$ bind with the silicate ions ($SiO_4^{2-}$) contained in the rust proofing treatment liquid for a threaded part to produce insoluble metal silicate in the surface layer of the corrosion-resistant film.

It is preferable that the metal silicate is at least any silicate selected from the group consisting of calcium orthosilicate, calcium metasilicate, calcium sodium silicate, magnesium orthosilicate, magnesium metasilicate, magnesium calcium silicate, zinc orthosilicate, and zinc metasilicate.

The rust proofing treatment liquid for a threaded part applied to the surface of the threaded part is dried at room temperature to form a rustproof coating film. In order to promote drying, heating may be carried out as needed.

By this heating treatment, the following condensation reactions (A) to (C) proceed:

(A) dehydration condensation of metal silicate and silica in the resin binder;

(B) dehydration condensation of silica and resin in the resin binder; and (C) dehydration condensation between resins in the resin binder.

By the combination of the condensation reactions (A) to (C), a rustproof coating film composed of a polymer having a network structure is formed.

Figure 4:
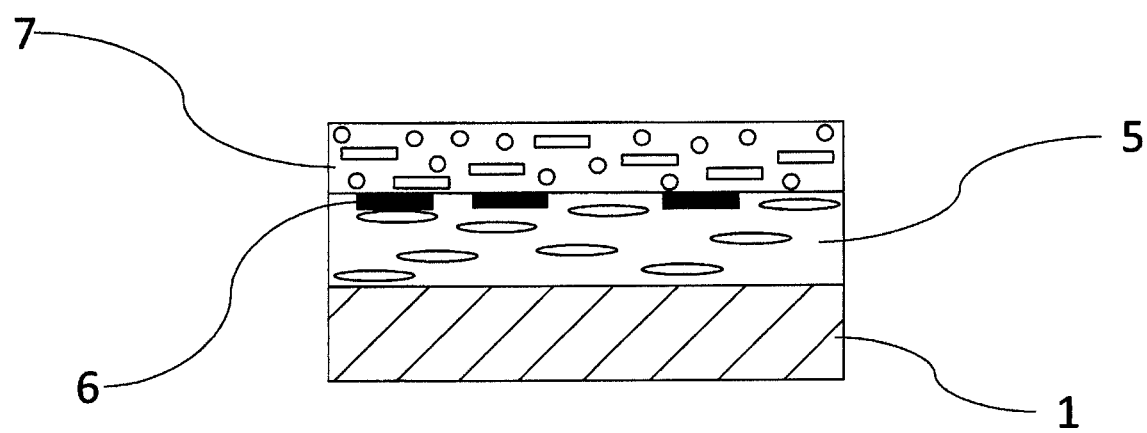
FIG. 4 is an image diagram of a coating film of a threaded part rust-proofed using a rust proofing treatment liquid for a threaded part according to the present invention.

As shown in FIG. 4, the threaded part rust-proofed through the above steps has a structure including a corrosion-resistant film 5 on a surface of the iron substrate 1, metal silicate 6 on the surface layer of the corrosion-resistant film 5, and a rustproof coating film 7 on the surface of the corrosion-resistant film 5.

The above structure has a structure in which the respective components of metal silicate, silica, resin, and wax are densely bound, thereby exhibiting effects such as improvement of corrosion resistance and stabilization of friction coefficient.

According to the present invention having the above feature, it is possible to carry out coating treatment at one time without using an organic solvent, thereby forming a rustproof coating film capable of suppressing an increase in friction coefficient even when tightening is repeated.

EXAMPLES

Hereinafter, the present invention will be specifically described based on examples, but the present invention is not limited to the following examples.

Example 1

Mixed were a binder resin consisting of 30% by mass of a modified epoxy resin obtained by graft polymerization using a carboxylic acid-containing acrylic polymer as a side chain and 24% by mass of a binder containing silica, 23% by mass of a polyethylene wax, 0.4% by mass of a violet pigment, and 22.6% by mass of water while stirring to prepare a rust proofing treatment liquid for a threaded part.

This treatment liquid is excellent in temperature stability and does not change in properties within a range between 0° C. and 50° C. A steel bolt (M14) in which a corrosion-resistant film had previously been formed by hot-dip galvanizing was immersed in this rust proofing treatment liquid for a threaded part, then taken out, and dehydrated using a centrifugal dehydrator. After that, it was dried at room temperature to form a rustproof coating film on the corrosion-resistant film. This rustproof coating is composed of a polymer with a network structure obtained by polymerizing a rust proofing treatment liquid for a threaded part containing a modified epoxy resin obtained by graft polymerization using a carboxylic acid-containing acrylic polymer as a side chain and a silica binder.

Figure 5:
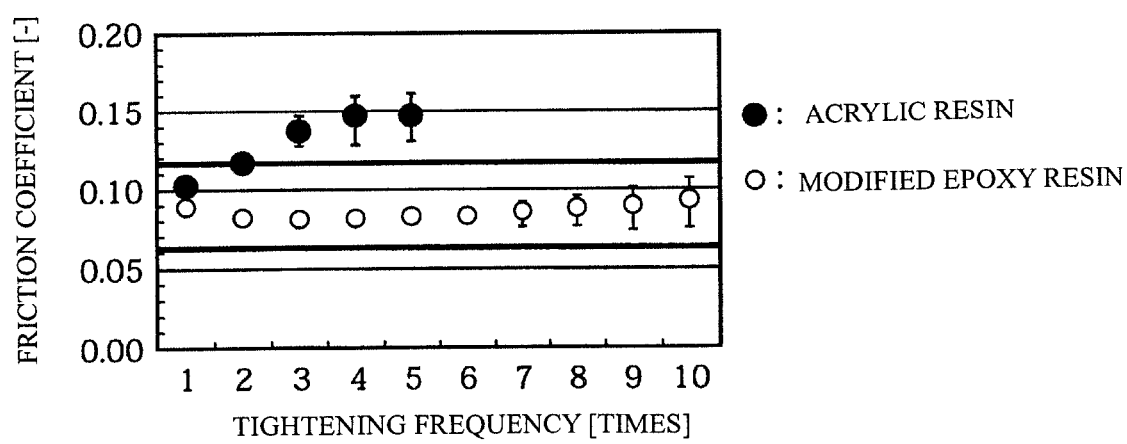
FIG. 5 is a graph showing a change in friction coefficient in Examples.

The resulting bolt was repeatedly tightened, and the friction coefficient between the bolt itself and a nut was measured. For comparison, a bolt having the same size and surface-treated using a conventional acrylic resin-based treatment liquid was used to repeat tightening, and a friction coefficient between the bolt itself and a nut was measured. The results are shown in FIG. 5. Thus, according to the present invention, the friction coefficient was stable at a level of 0.1 or less even when tightening was repeated ten times. On the other hand, in the comparative example, the friction coefficient reached 0.15 when tightening was repeated five times.

The corrosion resistance was evaluated for the obtained bolts through a scratch corrosion resistance test on a zinc-rich paint and a salt spray test after impact tightening. As a result, it was confirmed that the bolt of the example and the bolt of the comparative example had excellent corrosion resistance.

Example 2

Mixed were a binder resin consisting of 28% by mass of a modified acrylic resin obtained by graft polymerization using a carboxylic acid-containing acrylic polymer as a side chain and 44% by mass of a binder containing silica, 0.1% by mass of a blue pigment, and 27.9% by mass of water while stirring to prepare a rust proofing treatment liquid for a threaded part. A steel bolt (M14) in which a corrosion-resistant film had previously been formed by hot-dip galvanizing was immersed in this rust proofing treatment liquid for a threaded part, then taken out, and dehydrated using a centrifugal dehydrator. After that, it was dried at room temperature to form a rustproof coating film on the corrosion-resistant film. This rustproof coating film is composed of a polymer with a network structure obtained by polymerizing a rust proofing treatment liquid for a threaded part containing a modified acrylic resin obtained by graft polymerization using a carboxylic acid-containing acrylic polymer as a side chain.

Unlike Example 1, the obtained bolt did not contain a polyethylene wax and thus had no effect of stabilizing the friction coefficient, but was equal to or higher than that of the bolt surface-treated with a conventional acrylic resin-based treatment liquid in terms of the corrosion resistance.

REFERENCE SIGNS LIST 1 iron substrate
2 zinc plating layer
3 friction coefficient stabilizing layer
4 rust inhibitor layer
5 corrosion-resistant film
6 metal silicate
7 rustproof coating film

The invention claimed is:

1. A rust-proofed threaded part comprising a corrosion-resistant film, which is formed on an iron substrate as a first surface layer of the iron substrate, an insoluble metal silicate that is in an outer surface layer of the corrosion-resistant film, and a rustproof coating film, which has an inner surface and an outer surface, that is formed on the corrosion-resistant film, as an exposed second surface layer of the iron substrate, such that the rustproof coating film has a thickness of 2 to 4 μm and the insoluble metal silicate is contained between the corrosion-resistant film and the rustproof coating film, wherein the insoluble metal silicate is on the outer surface layer of the corrosion-resistant film and the inner surface of the rustproof coating film is on the insoluble metal silicate and the outer surface layer of the corrosion-resistant film, and wherein the rustproof coating film is composed of a polymer with a network structure obtained by polymerizing a rust proofing treatment liquid for a threaded part, the rust proofing treatment liquid containing a silica binder and at least one of a modified epoxy resin obtained by graft polymerization using a carboxylic acid-containing acrylic polymer as a side chain and a modified acrylic resin obtained by graft polymerization using a carboxylic acid-containing acrylic polymer as a side chain.

2. The rust-proofed threaded part according to claim 1, wherein the insoluble metal silicate is at least one metal silicate selected from the group consisting of calcium orthosilicate, calcium metasilicate, calcium sodium silicate, magnesium orthosilicate, magnesium metasilicate, magnesium calcium silicate, zinc orthosilicate, and zinc metasilicate.

* * * * *